(12) United States Patent
Chen

(10) Patent No.: US 11,433,399 B2
(45) Date of Patent: Sep. 6, 2022

(54) KITCHEN WASTE PROCESSOR AND METHOD FOR PROCESSING KITCHEN WASTE

(71) Applicant: Jack Ya Jyue Chen, Taichung (TW)

(72) Inventor: Jack Ya Jyue Chen, Taichung (TW)

( * ) Notice: Subject to any disclaimer, the term of this patent is extended or adjusted under 35 U.S.C. 154(b) by 11 days.

(21) Appl. No.: 17/155,358

(22) Filed: Jan. 22, 2021

(65) Prior Publication Data

US 2021/0379598 A1 Dec. 9, 2021

(30) Foreign Application Priority Data

Jun. 5, 2020 (TW) ................................. 109118990

(51) Int. Cl.
*B02C 18/00* (2006.01)
*B65F 1/16* (2006.01)

(52) U.S. Cl.
CPC ........ *B02C 18/0092* (2013.01); *B65F 1/1607* (2013.01); *B65F 2001/1669* (2013.01)

(58) Field of Classification Search
CPC . B02C 18/0092; B02C 18/0084; B02C 18/06; B02C 18/065; B02C 18/08; B02C 18/10; B02C 2201/06; B65F 1/16; B65F 1/1607; B65F 2210/188; B65F 2210/179; B65F 2001/1669; A47J 43/044; A47J 43/046; E03C 1/126
See application file for complete search history.

(56) References Cited

U.S. PATENT DOCUMENTS

| | | | | | |
|---|---|---|---|---|---|
| 1,566,303 | A | * | 12/1925 | Birney | B65D 45/28 292/259 R |
| 4,691,840 | A | * | 9/1987 | Ferbrache | B65D 25/2852 220/318 |
| 4,704,764 | A | * | 11/1987 | Metelko, Jr. | B65F 1/10 15/301 |
| 4,748,905 | A | * | 6/1988 | Langdon | B65F 1/06 53/107 |
| 5,477,623 | A | * | 12/1995 | Tomizawa | F26B 25/005 34/58 |

(Continued)

FOREIGN PATENT DOCUMENTS

CN 108045803 A * 5/2018
CN 108212379 A * 6/2018
(Continued)

*Primary Examiner* — Adam J Eiseman
*Assistant Examiner* — Fred C Hammers
(74) *Attorney, Agent, or Firm* — Rosenberg, Klein & Lee

(57) ABSTRACT

A kitchen waste processor includes a base including a basket which has a heater located therein. A driver rotates the basket which is pivotably supported by a support. A container is located in the basket and protrudes beyond the open top of the basket. A cover has a hole defined centrally therethrough, and a seal is located within the hole. A vacuum suction pipe or a blade shaft extends through the hole. A locking device is located between the container and the cover to seal the cover to the container. The container receives kitchen waste and bacteria therein. The heater heats the container while the container is driven by the driver to spin, so that the kitchen waste in the container is fermented under high temperature to transfer the kitchen waste into fertilizer.

8 Claims, 9 Drawing Sheets

(56) References Cited

U.S. PATENT DOCUMENTS

| | | | | | |
|---|---|---|---|---|---|
| 5,551,170 | A | * | 9/1996 | Sakatani | B02C 17/002 |
| | | | | | 34/554 |
| 6,106,853 | A | * | 8/2000 | Cox | A61L 9/20 |
| | | | | | 424/665 |
| 2016/0348007 | A1 | * | 12/2016 | Qiu | C10B 19/00 |
| 2020/0072712 | A1 | * | 3/2020 | Olson | B02C 18/30 |

FOREIGN PATENT DOCUMENTS

| | | | | | |
|---|---|---|---|---|---|
| JP | | 2004313931 | * | 4/2003 | |
| JP | | 2004313931 | A * | 11/2004 | |
| WO | WO-2008059622 | A1 | * | 5/2008 | B02C 18/0092 |

* cited by examiner

KITCHEN WASTE PROCESSOR AND METHOD FOR PROCESSING KITCHEN WASTE

BACKGROUND OF THE INVENTION

1. Fields of the Invention

The present invention relates to a kitchen waste processor and method for processing kitchen waste so as to transfer kitchen waste into fertilizer.

2. Descriptions of Related Art

Generally, kitchen waste are conventionally put in containers in the back alley, and the city waste collector agents collect these containers to be further processed. However, the containers usually generate odors and attract rats. Actually, the kitchen waste is more valuable than people realized, the present invention intends to provide a kitchen waste processor and a method for processing kitchen waste so as to transfer kitchen waste into fertilizer.

SUMMARY OF THE INVENTION

The present invention relates to a kitchen waste processor and comprises a base including a basket with an open top, and a heater is located in the basket. A driver is connected to the underside of the basket. A first connector is connected to the driver which rotates the first connector. A support is pivotably connected to outside of the basket of the base. A container is located in the basket and protrudes beyond the open top of the basket. A second connector is connected to the underside of the container and connected to the first connector. A cover has a hole defined centrally therethrough, and a seal is located within the hole. A vacuum suction pipe or a blade shaft extends through the hole. A locking device is located between the container and the cover to seal the cover to the container. The container receives kitchen waste and bacteria therein. The heater heats the container and the driver spins the container so that the kitchen waste in the container is fermented under high temperature to transfer the kitchen waste into fertilizer.

Preferably, a vacuum deodorizer is connected to the vacuum suction pipe, and the vacuum deodorizer is connected to a check valve, a steam separator, a filter, a cooler, a vacuum pump and a mixer.

Preferably, the mixer receives bamboo charcoal and bamboo vinegar therein.

Preferably, a grinder is connected to the blade shaft.

Preferably, the heater heats the container by electro-magnetic microwave.

Preferably, the locking device includes a handle and two lugs. The handle is connected to the cover, and the two lugs are formed to the open top of the container. Each lug includes a notch. The handle includes two eccentric parts on two ends thereof. The two eccentric parts are respectively engaged with the notches of the lugs.

The present invention provides a method for processing kitchen waste, and the method comprises the following steps:

a step of adding kitchen waste and bacteria: adding kitchen waste and bacteria in a container;

a step of covering: covering the container by a cover which includes a hole defined centrally therethrough, a seal located within the hole, a vacuum suction pipe or a blade shaft extending through the hole;

a step of grinding: grinding the kitchen waste by a grinder which is connected to the blade shaft;

a step of odors removal: connecting a vacuum deodorizer with the vacuum sucking pipe, and sucking odors away from the container by the vacuum deodorizer, and a step of heating and spinning: putting the container in a basket which includes a heater and a driver, the container being heated while spinning to ferment the kitchen waste, and transferring the kitchen waste into fertilizer.

Preferably, the vacuum deodorizer is connected to a check valve, a steam separator, a filter, a cooler, a vacuum pump and a mixer in series.

Preferably, the vacuum deodorizer includes a mixer which receives bamboo charcoal and bamboo vinegar therein.

The advantages of the present invention are that the kitchen waste is ground in the processor and is added with bacteria under high temperature in a vacuum circumstance while the container spins. The kitchen waste in the container is fermented under high temperature to transfer the kitchen waste into fertilizer.

The method of the present invention separates steam and moisture from the processed and fermented kitchen waste, and the processed and fermented kitchen waste is filtered and cooled to prevent from attracting rats or the like.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
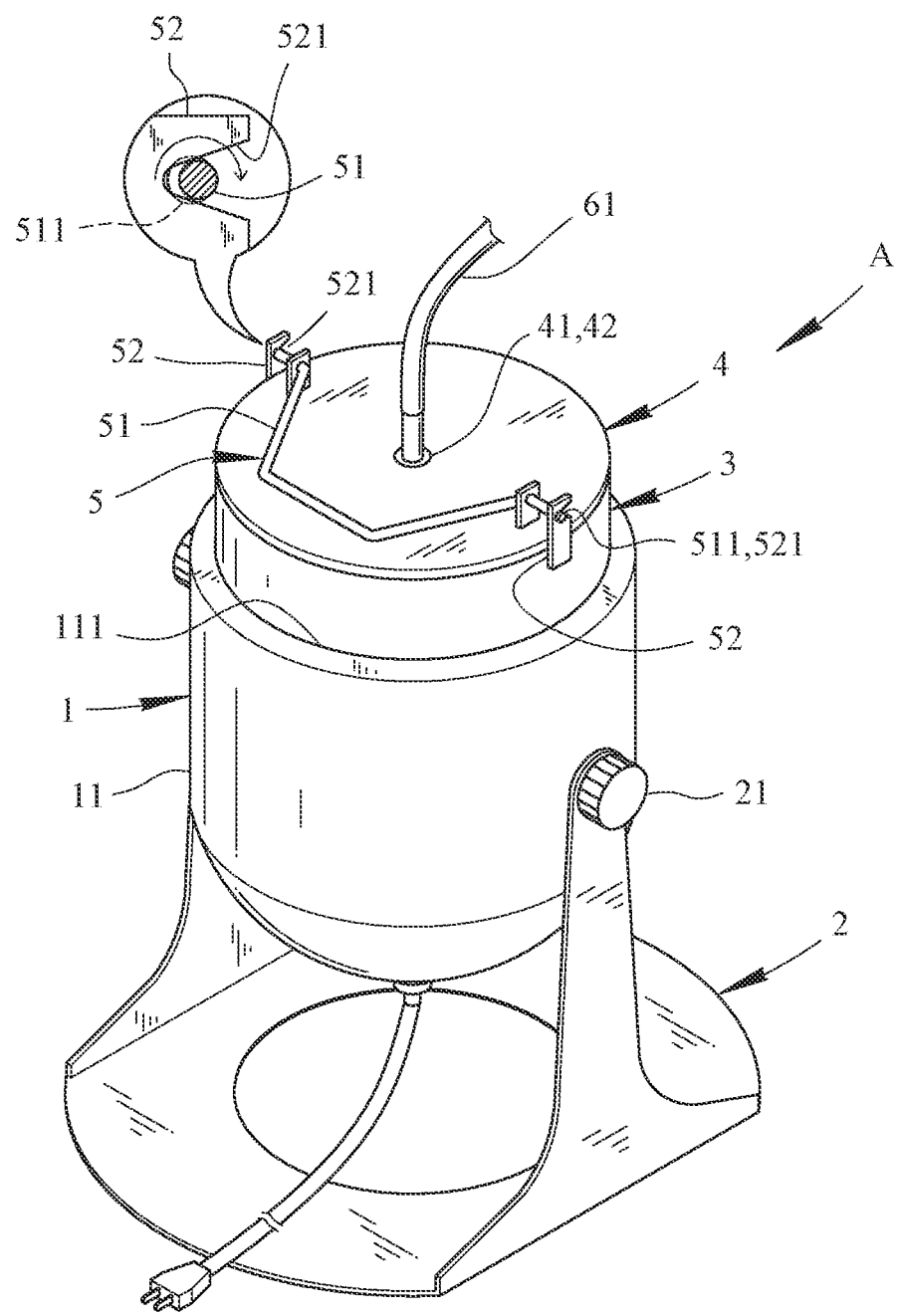
FIG. 1 is a perspective view to show the kitchen waste processor of the present invention.
Figure 8:
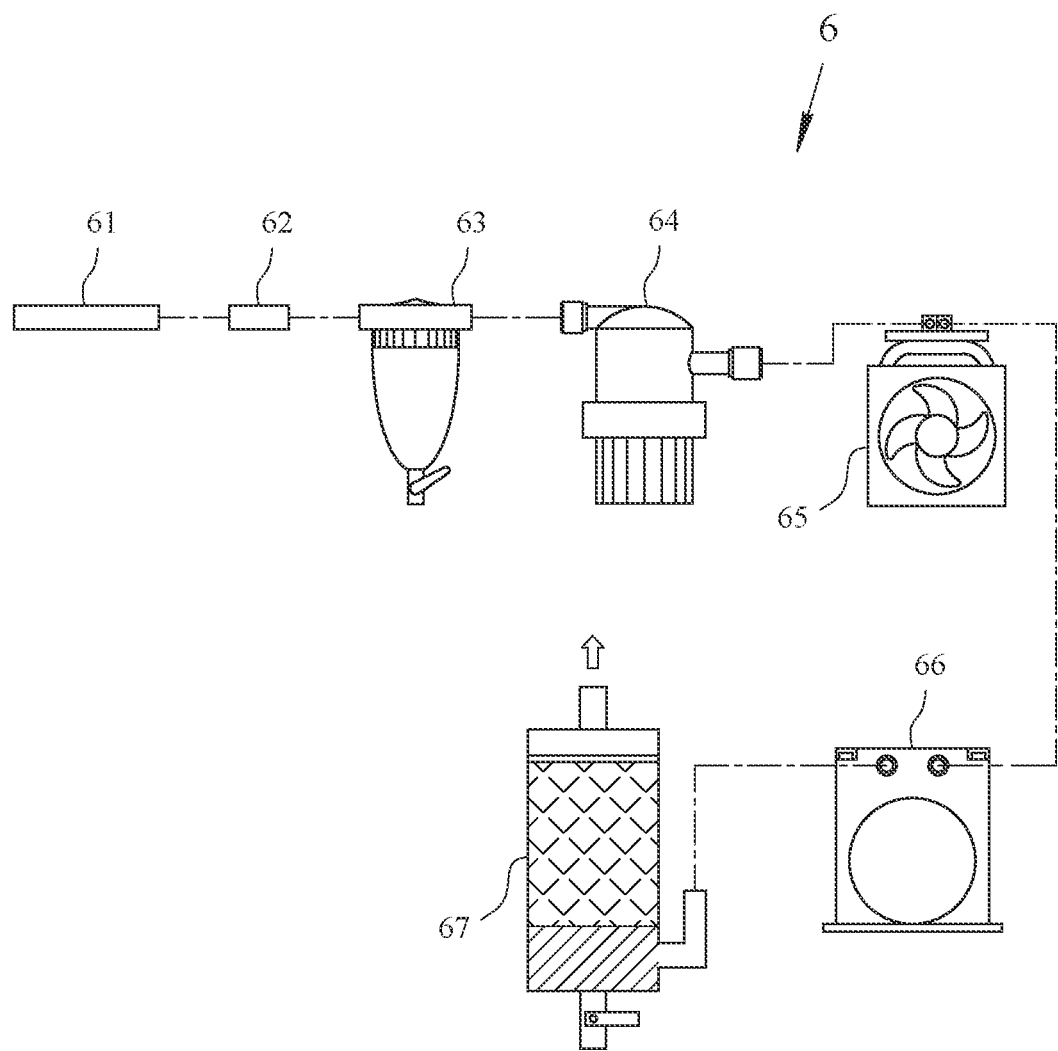
FIG. 8 shows the vacuum deodorizer of the kitchen waste processor of the present invention.

Referring to FIGS. 1 and 8, the kitchen waste processor "A" of the present invention comprises a base 1, a support 2, a container 3, a cover 4, a locking device 5, a vacuum deodorizer 6 and/or a grinder 7.

Figure 2:
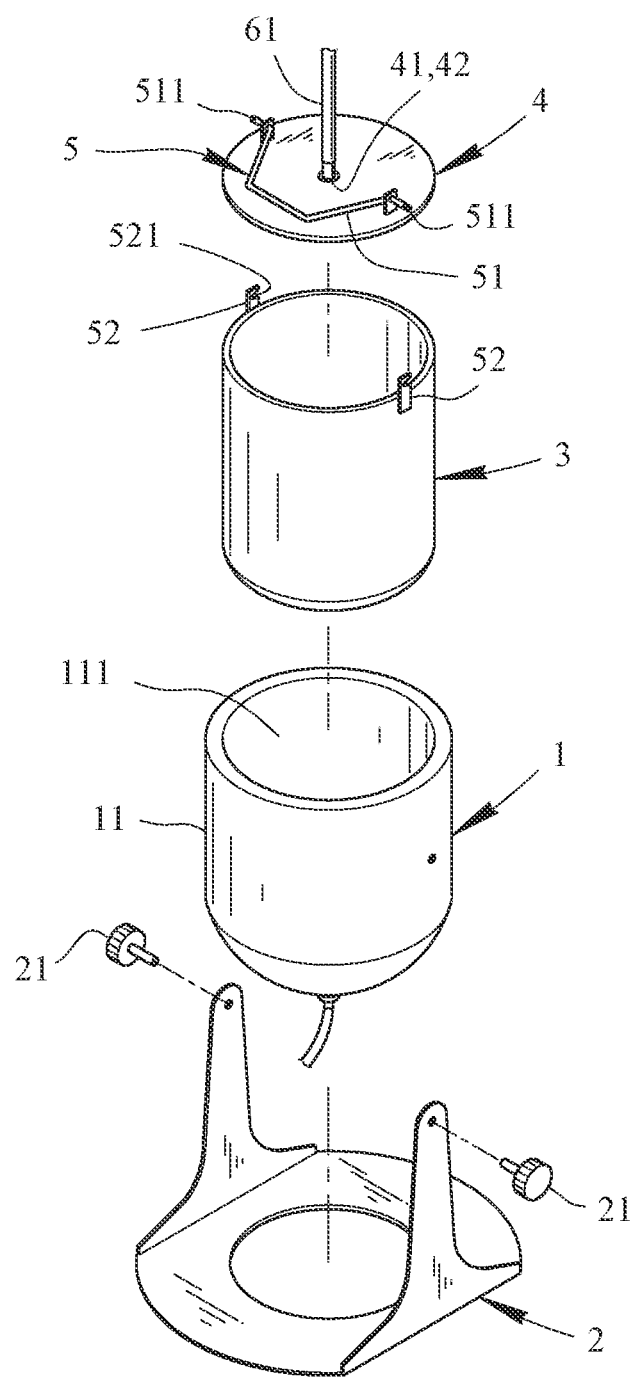
FIG. 2 is an exploded view of the kitchen waste processor of the present invention.

As shown in FIGS. 1 and 2, the base 1 is a cylindrical base and includes a basket 11 with an open top 111. A heater 12 is located in the basket 11. A driver 13 is connected to the underside of the basket 11, and a first connector 131 is connected to the driver 13 which rotates the first connector 131. The heater 12 is a cylindrical heater which is mounted to the container 3 so as to heat the container 3 by electromagnetic microwave to generate Eddy current.

Figure 5:
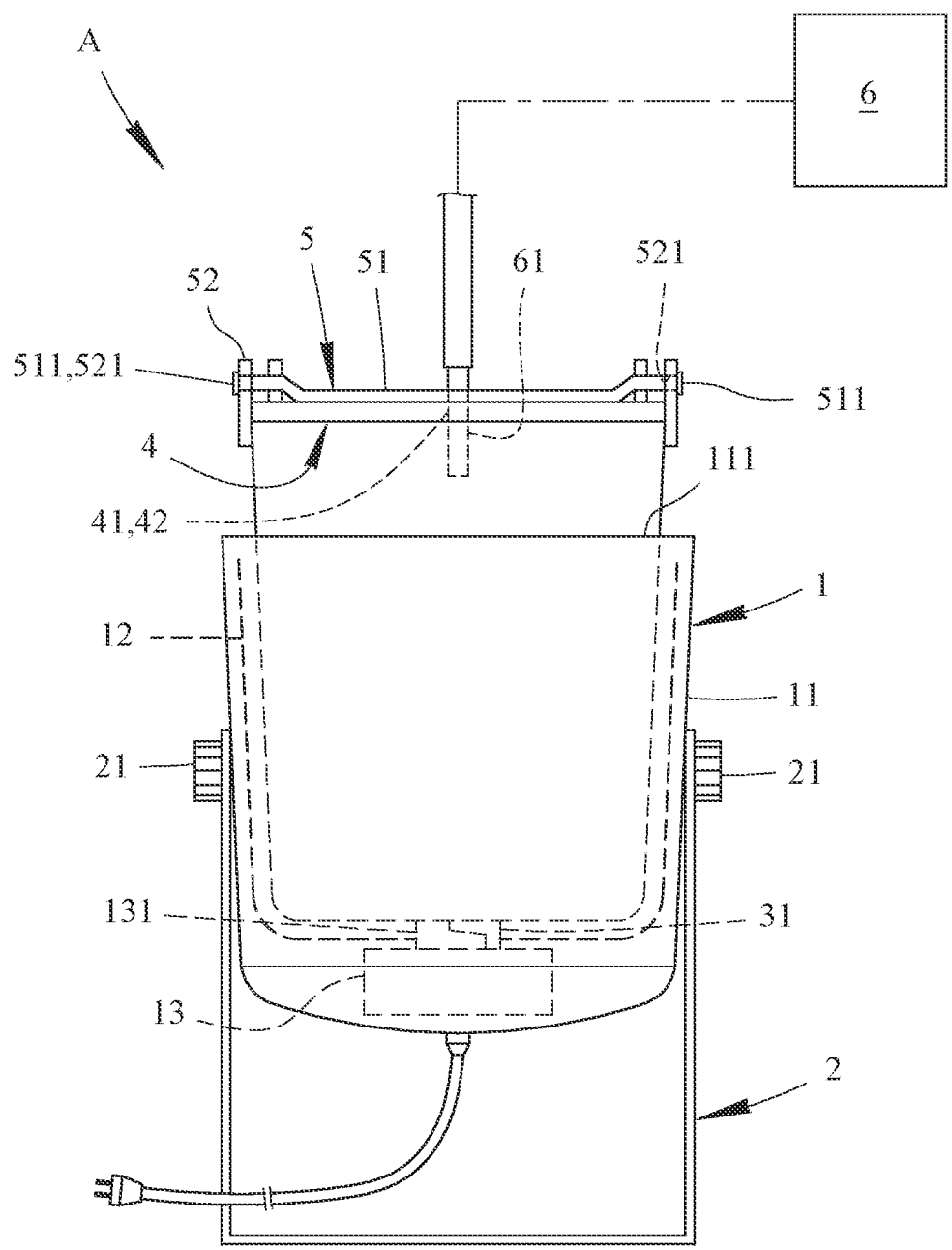
FIG. 5 shows that the vacuum deodorizer is connected to the kitchen waste processor of the present invention in an upright status.
Figure 6:
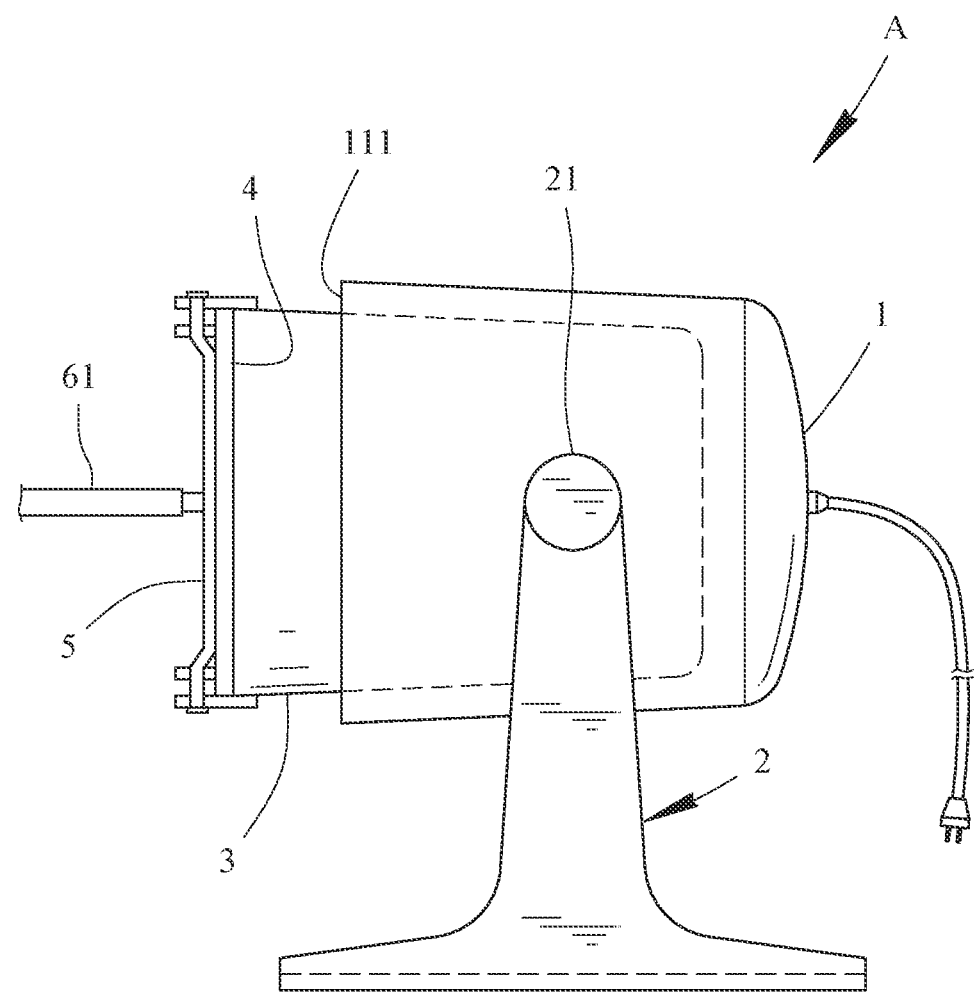
FIG. 6 shows that the vacuum deodorizer is connected to the kitchen waste processor of the present invention in a horizontal status.
Figure 7:
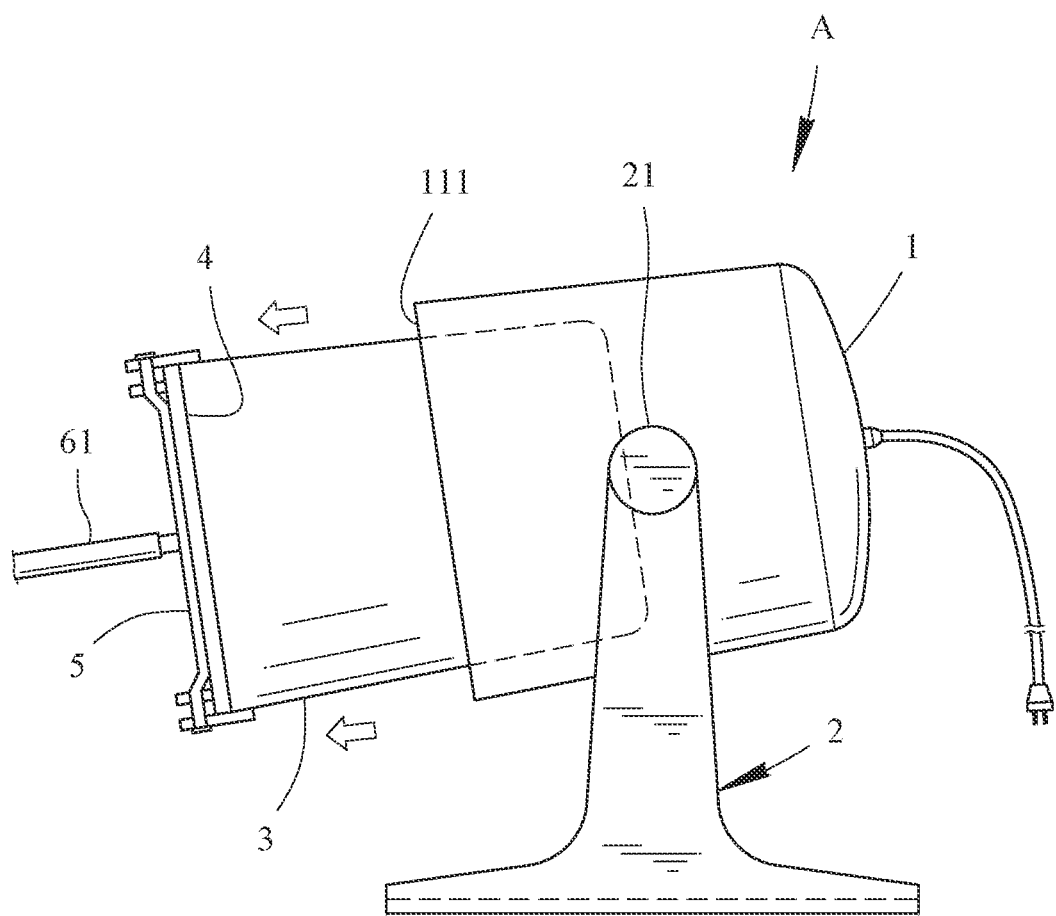
FIG. 7 shows that the vacuum deodorizer is connected to the kitchen waste processor of the present invention in an inclined status.

The support 2 is a U-shaped frame and pivotably connected to outside of the basket 11 of the base 1 so as to support the kitchen waste processor "A". As shown in FIGS. 5 to 7, there are a pair of fasteners 21 at the connection between the base 1 and the support 2 such that the base 1 and the container 3 are able to be positioned in an upright status, a horizontal status and an inclined status by the fasteners 21.

Figure 4:
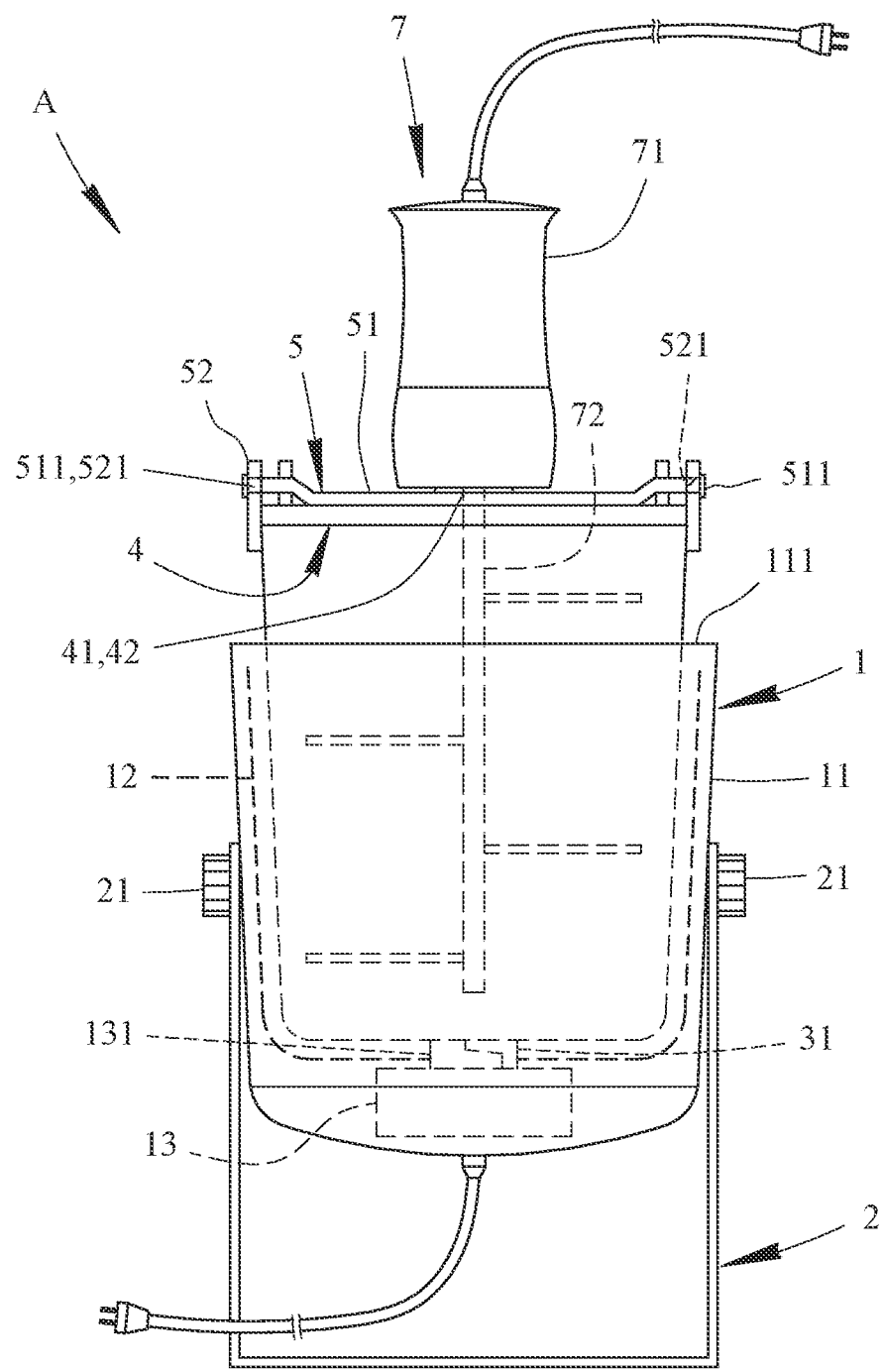
FIG. 4 shows the grinder in the kitchen waste processor of the present invention.

As shown in FIGS. 2, 4 and 5, the container 3 is located in the basket 11 and protrudes beyond the open top 111 of the basket 11. A second connector 31 is connected to the underside of the container 3 and connected to the first connector 131. The driver 13 spins the container 3 by the connection of the first and second connectors 131, 31.

Figure 3:
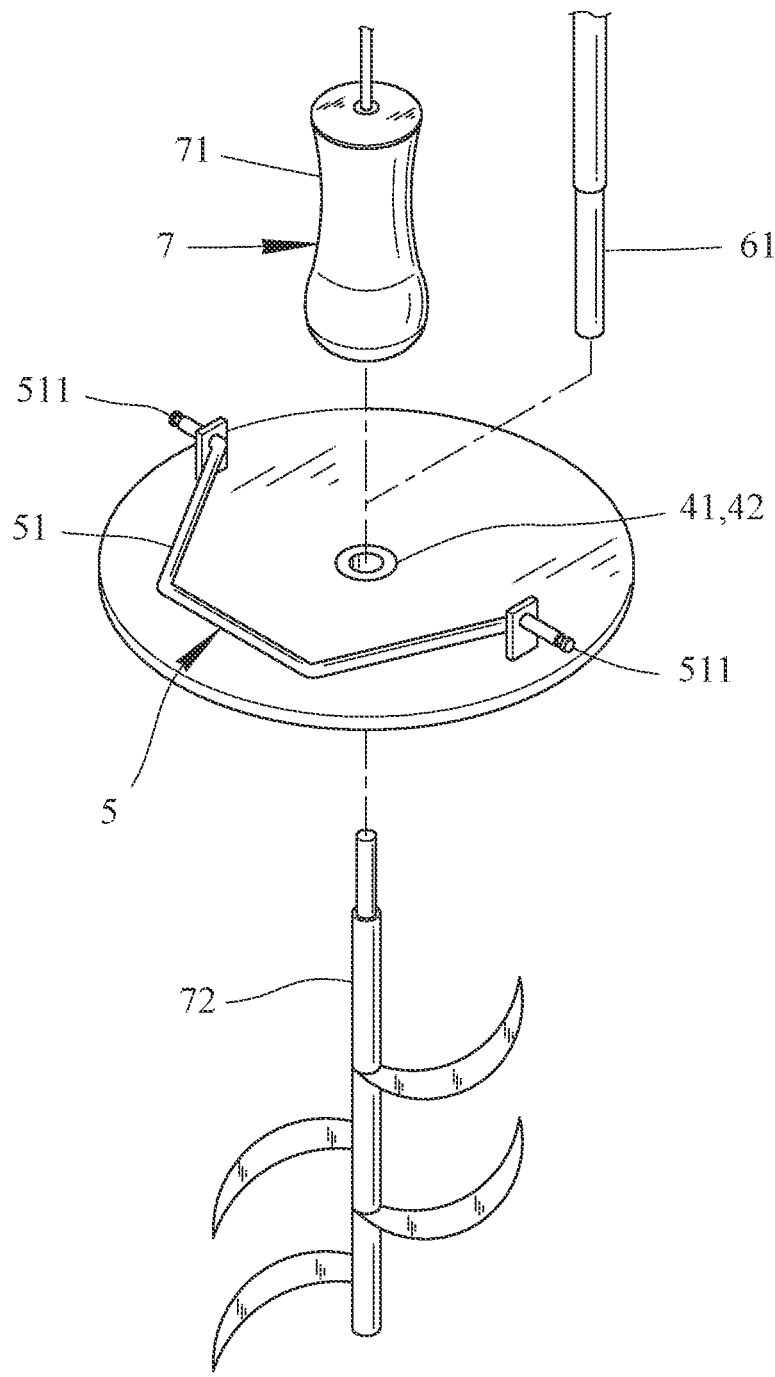
FIG. 3 shows the grinder, the cover and the blade shaft of the kitchen waste processor of the present invention.

As shown in FIGS. 2, 3 and 4, the cover 4 has a hole 41 defined centrally therethrough, and a seal 42 is located within the hole 41. The vacuum suction pipe 61 or the blade shaft 72 may extend through the hole 41. The seal 42 is made of durable material such as rubber to air tight the vacuum suction pipe 61 and the blade shaft 72.

As shown in FIGS. 2, 3 and 4, the locking device 5 is located between the container 3 and the cover 4 to seal the cover 4 to the container 3. The locking device 5 includes a handle 51 and two lugs 52. The handle 51 is connected to the cover 4. The two lugs 52 are formed to an open top of the container 3. Each lug 52 includes a notch 521, and the handle 51 includes two eccentric parts 511 on two ends thereof. As shown in FIG. 1, the two eccentric parts 511 are respectively engaged with the notches 521 of the lugs 52.

As shown in FIGS. 5 and 8, the vacuum deodorizer 6 which is connected to the vacuum suction pipe 61. The vacuum deodorizer 6 is connected to a check valve 62, a steam separator 63, a filter 64, a cooler 65, a vacuum pump 66 and a mixer 67. The vacuum suction pipe 61 sucks odors in the container due to fermentation of the kitchen waste in the container 3. The mixer 67 receives bamboo charcoal and bamboo vinegar therein. The odors in the container 3 is sucked by the vacuum suction pipe 61, and the odors pass through the check valve 62 and the steam separator 63 to remove moisture from the fermented kitchen waste. The fermented kitchen waste is then filtered by the filter 64. The odors are then cooled by the cooler 65 and sent into the mixer 67 to be treated to become clean air.

As shown in FIGS. 3 and 4, the grinder 7 includes a driving member 71 which is connected to the blade shaft 72. The blades on the blade shaft 72 are located in the container 3 to cut the kitchen waste. The driving member 71 is located on the cover 4, and shaped to be easily grabbed by users.

The container 3 receives kitchen waste and bacteria therein, and the kitchen waste is ground by the grinder 7. The grinder 7 is removed, and the vacuum suction pipe 61 of the vacuum deodorizer 6 is connected to the kitchen waste processor "A". The heater 12 heats the container 3 and the driver 13 spins the container 3 so that the kitchen waste in the container 3 is fermented under high temperature to transfer the kitchen waste into fertilizer.

Figure 9:
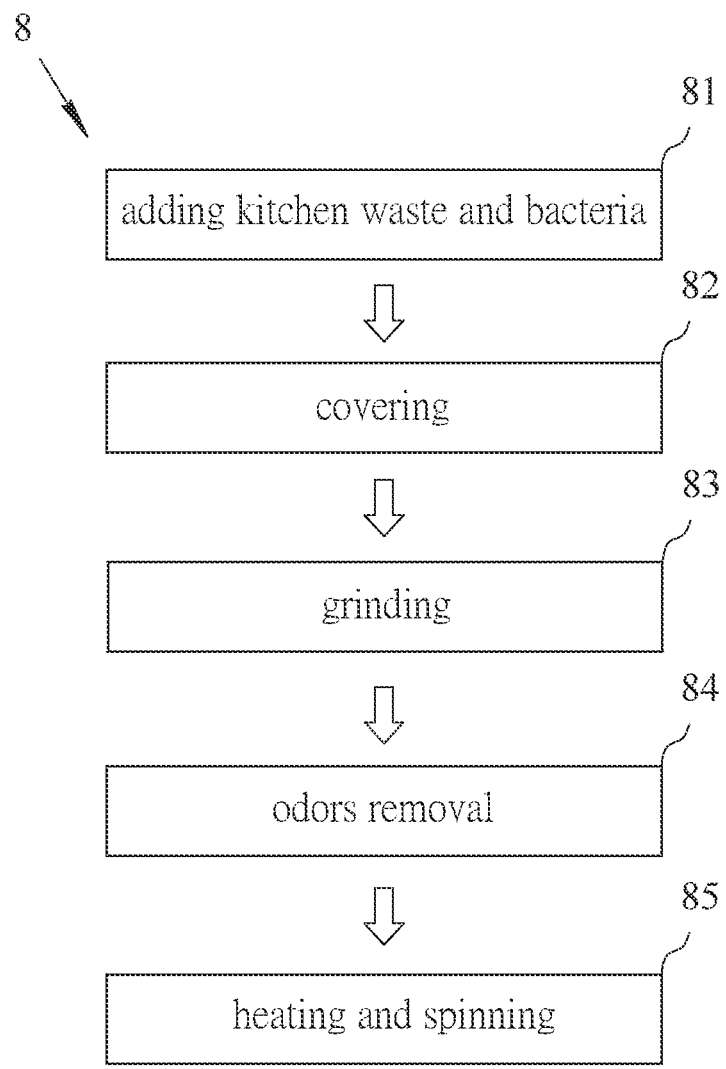
FIG. 9 shows the steps of the method of the present invention.

As shown in FIG. 9, the present invention provides a method 8 for processing kitchen waste, and comprises the following steps:

a step 81 of adding kitchen waste and bacteria: adding kitchen waste and bacteria in a container 3;

a step 82 of covering: covering the container 3 by a cover 4 which includes a hole 41 defined centrally therethrough, a seal 42 located within the hole 41, a vacuum suction pipe 61 or a blade shaft 72 extending through the hole 41;

a step 83 of grinding: grinding the kitchen waste by a grinder 7 which is connected to the blade shaft 72;

a step 84 of odors removal: connecting a vacuum deodorizer 6 with the vacuum sucking pipe 61, and sucking odor away from the container 3 by the vacuum deodorizer 6, and a step 85 of heating and spinning: putting the container 3 in a basket 11 which includes a heater 12 and a driver 13, the container 3 being heated while spinning to ferment the kitchen waste, and transferring the kitchen waste into fertilizer.

The vacuum deodorizer 6 is connected to a check valve 62, a steam separator 63, a filter 64, a cooler 65, a vacuum pump 66 and a mixer 67 in series. The vacuum deodorizer 6 includes a mixer 67 which receives bamboo charcoal and bamboo vinegar therein.

While we have shown and described the embodiment in accordance with the present invention, it should be clear to those skilled in the art that further embodiments may be made without departing from the scope of the present invention.

What is claimed is:

1. A kitchen waste processor, comprising:
a base extending between an open top and a closed bottom end, a heater disposed within the base to extend from a portion of base adjacent to the open top towards the closed bottom end, a driver disposed inside the base and located at the closed bottom end thereof, and a first connector disposed inside the base and connected to the driver for rotatably engaging the first connector;
a support pivotably connected to the base, thereby the base pivotably moves relative to the support;
a container disposed in the base and protruding beyond the open top of the base, a second connector disposed inside the base and connected both to an underside of the container and to the first connector, thereby the container being rotatable relative to the base;
a cover formed with a hole defined centrally therethrough, and a seal located within the hole, the cover being configured to alternatively receive a vacuum suction pipe therethrough in a first configuration and a blade shaft, therethrough in a second configuration,
wherein the blade shaft is rotatably driven independent of the driver; and
a locking device disposed between the container and the cover to seal the cover and the container relative to one another, the container receiving kitchen waste and bacteria therein,
wherein the heater heats the container and the driver spins the container, thereby the kitchen waste in the container is fermented under high temperature to produce a fertilizer;
further comprising a vacuum deodorizer is connected to the vacuum suction pipe, the vacuum deodorizer including a check valve, a steam separator, a filter, a cooler, a vacuum pump, and a mixer, and the vacuum suction pipe being serially connected to the check valve, the steam separator, the filter, the cooler, the vacuum pump, and the mixer.

2. The kitchen waste processor as claimed in claim 1, further comprising a grinder connected to the blade shaft, wherein the grinder is driven independent of the driver.

3. The kitchen waste processor as claimed in claim 1, wherein the mixer receives bamboo charcoal and bamboo vinegar therein.

4. The kitchen waste processor as claimed in claim 1, wherein the heater heats the container by electro-magnetic microwave.

5. The kitchen waste processor as claimed in claim 1, wherein the locking device includes a handle and two lugs, the handle being connected to the cover, the two lugs being formed at a wall section of the container proximal to the open top of the container, each lug including a notch, the handle including two eccentric parts formed on two respective opposing ends thereof, the two eccentric parts of the handle being respectively engaged with corresponding notches of the lugs.

6. A method for processing kitchen waste, comprising:

adding the kitchen waste and bacteria in a container;

covering the container by a cover, the cover including a hole defined centrally therethrough, and a seal located within the hole, wherein the cover is configured to alternatively receive a vacuum suction pipe therethrough in a first configuration and a blade shaft therethrough in a second configuration;

grinding the kitchen waste by a grinder, the grinder being connected to the blade shaft;

connecting a vacuum deodorizer with the vacuum suction pipe, and sucking odor away from the container by the vacuum deodorizer, and putting the container in a base including a heater and a driver, and heating and spinning the container to ferment the kitchen waste to thereby produce a fertilizer.

7. The method as claimed in claim 6, wherein the vacuum deodorizer includes a check valve, a steam separator, a filter, a cooler, a vacuum pump, and a mixer, and connecting serially the vacuum suction pipe to the check valve, the steam separator, the filter, the cooler, the vacuum pump, and the mixer.

8. The method as claimed in claim 7, further comprising: receiving bamboo charcoal and bamboo vinegar in the mixer.

\* \* \* \* \*